(12) United States Patent
Pichette et al.

(10) Patent No.: US 10,924,696 B2
(45) Date of Patent: Feb. 16, 2021

(54) HYPERSPECTRAL IMAGER FOR SNAPSHOT AND LINE-SCAN MODES

(71) Applicant: IMEC VZW, Leuven (BE)

(72) Inventors: Julien Pichette, Leuven (BE); Nicolaas Tack, Leuven (BE)

(73) Assignee: IMEC VZW, Leuven (BE)

( * ) Notice: Subject to any disclaimer, the term of this patent is extended or adjusted under 35 U.S.C. 154(b) by 0 days.

(21) Appl. No.: 16/002,253

(22) Filed: Jun. 7, 2018

(65) Prior Publication Data

US 2018/0359438 A1 Dec. 13, 2018

(30) Foreign Application Priority Data

Jun. 8, 2017 (EP) ..................................... 17174980

(51) Int. Cl.
*H04N 5/369* (2011.01)
*H04N 5/374* (2011.01)
(Continued)

(52) U.S. Cl.
CPC ......... *H04N 5/3692* (2013.01); *H04N 5/2353* (2013.01); *H04N 5/349* (2013.01);
(Continued)

(58) Field of Classification Search
CPC ...... H04N 5/3692; H04N 5/349; H04N 9/045; H04N 5/2353; H04N 5/374; G02B 5/201
See application file for complete search history.

(56) References Cited

U.S. PATENT DOCUMENTS 6,529,239 B1 * 3/2003 Dyck ................ H01L 31/02162
257/E31.121
8,432,434 B2 4/2013 Veeraraghavan et al.
(Continued)

FOREIGN PATENT DOCUMENTS

JP 2003163940 A 6/2003
WO WO-2010066381 A1 6/2010
(Continued)

OTHER PUBLICATIONS

Degans, "Imec Introduces Snapscan: the First Hyperspectral Imaging Camera that Fuses the Benefits of Snapshot and Linescan technologies", Jan. 31, 2017.
(Continued)

*Primary Examiner* — Twyler L Haskins
*Assistant Examiner* — Angel L Garces-Rivera
(74) *Attorney, Agent, or Firm* — Moser Taboada (57) ABSTRACT

An image sensor for acquiring an image of an object comprises: an array of photo-sensitive areas (112); and a mosaic filter (114) associated with the array dividing the array into sub-groups (118) of photo-sensitive areas (112) extending across at least two rows and two columns, wherein the mosaic filter (114) transmits unique light properties to the photo-sensitive areas (112) within the sub-group (118); wherein the mosaic filter (114) comprises a sequence of unique filter portions associated with a set of photo-sensitive areas (112) along a row, wherein the set extends through more than one sub-group (118); wherein sequences comprising the unique filter portions are associated with each row and wherein the sequences associated with adjacent rows comprise different orders of the unique filter portions, such that different light properties are transmitted to photo-sensitive areas (112) in the same column of adjacent rows.

12 Claims, 3 Drawing Sheets

(51) Int. Cl.
  *H04N 5/235* (2006.01)
  *H04N 9/04* (2006.01)
  *H04N 5/349* (2011.01)
  *G02B 5/20* (2006.01)

(52) U.S. Cl.
  CPC .............. *H04N 5/374* (2013.01); *H04N 9/045* (2013.01); *G02B 5/201* (2013.01)

(56) References Cited

U.S. PATENT DOCUMENTS

| | | |
|---|---|---|
| 9,237,286 B2 | 1/2016 | Theuwissen |
| 2005/0151861 A1 | 7/2005 | Bornstein et al. |
| 2008/0123097 A1 | 5/2008 | Muhammed et al. |
| 2008/0130991 A1* | 6/2008 | O'Brien ................. H04N 9/045 382/167 |
| 2015/0281601 A1 | 10/2015 | Ganapathi et al. |
| 2016/0334276 A1 | 11/2016 | Pluvinage |
| 2018/0020170 A1 | 1/2018 | Pichette et al. |

FOREIGN PATENT DOCUMENTS

| | | |
|---|---|---|
| WO | WO-2012084531 A1 | 6/2012 |
| WO | WO-2018035597 A1 | 3/2018 |

OTHER PUBLICATIONS

Extended European Search Report dated Nov. 24, 2017 for Application No. 17174980.7.
Pichette et al., "Fast & Compact Internal Scanning CMOS-based Hyperspectral Camera: the Snapscan", SPIE OPTO, 2017.
European Office Action for Application No. 17174980.7, dated Apr. 9, 2019.

\* cited by examiner

HYPERSPECTRAL IMAGER FOR SNAPSHOT AND LINE-SCAN MODES

CROSS-REFERENCE TO RELATED APPLICATIONS

This application claims priority to and the benefit of European Patent Application No. 17174980.7, filed on Jun. 8, 2017, the disclosure of which is incorporated herein by reference in its entirety.

TECHNICAL FIELD

The present inventive concept relates to a method, an image sensor and a device for acquiring an image. In particular, the present inventive concept relates to acquiring an image having two-dimensional spatial resolution and a further resolution of different light properties.

BACKGROUND

Line-scan image capturing devices are often used when an image of an object is to be acquired with high spectral resolution. Line-scan image capturing devices may typically be used in remote sensing or imaging of objects on a conveyor belt, wherein the object moves in relation to the image sensor.

A line-scan image capturing device may image a particular part of an object onto a row of pixels on an image sensor. As the object is moved, the particular part of the object is imaged onto another row of pixels on the image sensor. Different rows of pixels may be sensitive to different wavelengths of light, such that, as the object is moved over the sensor area, an image with high spectral and spatial resolution may be obtained.

Using a line-scan image capturing device may be particularly useful in specific applications, e.g. in remote sensing in light-starved situations, such as a camera installed in an aeroplane which monitors the ground below, and in imaging of objects on a conveyor belt. In such applications, the recording of received light in image rows may be synchronized with movement speed of the object on the sensor surface.

However, imaging of objects using a line-scan image capturing device is not very fast, as the object needs to be moved across the sensor surface in order for a full spectrally resolved image to be acquired. Also, the imaging is adapted to movement of an object in relation to the image capturing device.

It would be desirable to improve speed of imaging while maintaining the possibility of forming images with high spectral resolution as provided by line-scan imaging. Also, it would be desirable to extend usage of the concept of line-scan imaging to other applications.

SUMMARY

It is an object of the invention to provide a method and device facilitating capture of an image having two-dimensional spatial resolution and spectral resolution. It is a specific object of the invention to acquire hyperspectral images in a fast manner, using a compact and relatively simple camera.

These and other objects of the invention are at least partly met by the invention as defined in the independent claims. Preferred embodiments are set out in the dependent claims.

According to a first aspect, there is provided a method of acquiring an image of an object, said method comprising: acquiring a plurality of frames in a time sequence, each frame being acquired using at least a portion of an array of photo-sensitive areas on at least one sensor surface, which at least one sensor surface is arranged in relation to at least one optical system in an image plane defined by the at least one optical system, wherein the photo-sensitive areas are configured to detect incident light from an object imaged by the at least one optical system onto the image plane, wherein the photo-sensitive areas are arranged in columns and rows of the array and wherein a mosaic filter is associated with the array such that the array is divided into sub-groups of photo-sensitive areas extending across at least two rows and two columns of the array, wherein the mosaic filter is configured to transmit a plurality of unique light properties to the photo-sensitive areas within the sub-group; during said time sequence, moving the at least one sensor surface in the image plane in relation to the at least one optical system in a direction extending along rows or columns of the array, wherein the plurality of frames, by said moving, are acquired using different positions of the at least one sensor surface in relation to the at least one optical system for imaging same portions of the object onto different photo-sensitive areas, whereby the plurality of frames acquires different light property information for the same portion of the object and a number of different light properties acquired for the same portion of the object is larger than the number of different light properties transmitted to photo-sensitive areas along a row or column within a sub-group.

According to the invention, at least one sensor surface may be translated in relation to at least one optical system, wherein each optical system of the at least one optical system defines an image plane. For brevity and simplicity, the relation between the at least one sensor surface and the at least one optical system will mainly be made in relation to a single sensor surface and a single optical system, although it should be realized that a plurality of sensor surfaces and a plurality of optical systems may be used, as also further described below. Also, the terms "a sensor surface" and "at least one sensor surface" as well as the terms "an optical system" and "at least one optical system" may be used interchangeably.

The sensor surface may be internally moved behind the optical system, such that an image plane defined by the optical system may be scanned by the sensor surface. This implies that a static scene may be imaged with high accuracy, as the image may be acquired with a resolution to different light properties, such as different wavelengths of light, by different rows of photo-sensitive areas of the sensor surface acquiring different light properties and the sensor surface is moved such that light property resolved information may be assigned to spatial positions on the object. There is no need for the object to be moved in relation to the optical system in order to acquire the image with high accuracy.

Further, the invention enables acquiring of an image using a compact imaging set-up. There is no need for complex components in the optical system and the optical system does not need to be changed during acquiring of an image. For instance, there is no need to use e.g. gratings for spectrally resolving received light and which may need to be movable for directing light of a specific wavelength to different rows of the photo-sensitive areas.

Also, thanks to the sensor surface being moved in relation to the optical system, different light properties may be acquired with a constant relationship between the object and an image plane. This implies that no imaging artefacts may be introduced by changes to the optical system. Further, imaging artefacts at edges of the optical system may also be avoided.

It should be realized that the acquiring of a frame and moving of the at least one sensor surface does not need to be alternately performed. On the contrary, moving of the at least one sensor surface may be continuously performed during a time period in which a plurality of frames is acquired. For instance, the acquiring of a frame may be triggered at a time when the continuously moved at least one sensor surface is in a desired position. If an exposure time used in acquiring a frame is relatively short compared to a speed of movement of the at least one sensor, the acquired frame will not be affected by a movement blur. However, the acquiring and moving may alternatively be alternately performed in a repetitive manner, wherein the moving of the at least one sensor surface is temporarily stopped during acquiring of a frame.

Thanks to a mosaic filter being associated with the array of photo-sensitive areas, a single frame that is acquired may image the object in a snapshot. The spatial resolution of such a snapshot may be limited by a size of a sub-group, as each sub-group may form a single image point in the pixel. However, the method enables acquiring an image of the object in a single frame, which substantially improves speed of imaging an object and enables providing an image of the object from a single exposure.

Each sub-group may provide a resolution of several unique light properties. Thus, in an image point acquired by a sub-group information of each of the several unique light properties is acquired. The mosaic filter is not identical for adjacent sub-groups of photo-sensitive areas, such that when the at least one sensor surface is moved e.g. along a row of the array, the same portion of the object will be imaged not only in relation to light property information provided by different filters in the row of a first sub-group but also in relation to light property information provided by further different filters, which are arranged in the row in a second sub-group. This implies that the number of different light properties acquired for the same portion of the object may be larger than the number of different light properties transmitted to the photo-sensitive areas in the row in the first sub-group.

The mosaic filter may be laid out in such a manner that when the at least one sensor surface is moved in the image plane and a plurality of frames are acquired, each image point of a combined image formed by the frames may comprise information pertaining to each of the light properties to which the photo-sensitive areas in the array is sensitive.

The image sensor thus enables acquiring an image of an object in a single frame, whereas the moving of the at least one sensor surface and acquiring of further frames may be used for improving the spatial resolution and the resolution to different light properties acquired by the single frame.

The unique light properties transmitted to photo-sensitive areas may be different wavelength bands. Hence, the mosaic filter may be configured to transmit a plurality of unique wavelength bands to the photo-sensitive areas within a sub-group. This implies that when the at least one sensor surface is moved, the plurality of frames may acquire different spectral information for the same portion of the object. Hence, the image sensor may enable acquiring of a spectrally resolved image based on the unique wavelength bands provided by the mosaic filter.

However, it should be realized that other light properties may be selectively transmitted to the photo-sensitive areas. Any combination of such different light properties may be provided by the mosaic filter, such that the mosaic filter need not necessarily filter the incident light with regard to a single aspect of light properties.

The unique light properties transmitted to photo-sensitive areas may thus be based on a wavelength of the light, a polarization of the light, an intensity of the light, and a propagation direction of the light (angle of incidence of the light towards the filter and the photo-sensitive area). The unique light properties transmitted to photo-sensitive areas may also be based on a combination of the above properties.

With regard to selection of intensity of light, it should be realized that a photo-sensitive area may be saturated when a certain intensity of light has been received (and hence no longer able to differentiate between different levels of intensity). By the mosaic filter may providing different levels of reducing light intensity reaching the photo-sensitive area, different photo-sensitive areas may be sensitive to different intensities of light, extending a dynamic range of the image sensor as a whole to the incident light.

The acquired information in a plurality of frames may be combined to form multiple channels of an image, wherein each channel may be formed based on each unique light property transmitted to photo-sensitive areas in the array. Thus, a two-dimensional image of the object may be provided for each unique light property. In other words, information may be acquired in three or more dimensions, such as two spatial dimensions and one spectral dimension, forming high resolution images with regard to each of the dimensions.

As mentioned above, the mosaic filter may not be identical in relation to each sub-group of photo-sensitive areas. For instance, a unique light property is not transmitted to the same (similarly placed) photo-sensitive area in each sub-group. Further, a set of unique light properties transmitted to the photo-sensitive areas within a sub-group need not be identical between different sub-groups. For instance, the mosaic filter may define two different sets of unique light properties and hence define two different types of sub-groups and the different types of sub-groups may be alternated within the array of photo-sensitive areas. Also, a size of sub-groups need not be identical but may vary between different sub-groups.

The mosaic filter being configured to transmit a plurality of unique light properties to the photo-sensitive areas within the sub-group may imply that each photo-sensitive area within the sub-group is associated with a unique filter portion and receives unique light properties different from the light properties received by the other photo-sensitive areas within the sub-group.

In other words, the filter portions may transmit mutually unique light properties to photo-sensitive areas in the sub-group.

According to an embodiment, the mosaic filter is configured to transmit an identical set of unique light properties to each sub-group in the array. This implies that, if an image is formed based on a single frame, each image point in the image comprises information relating to the same unique light properties. This may be advantageous if it is desired to take snapshots based on single frames.

According to an embodiment, the mosaic filter comprises a sequence of unique filter portions associated with a set of photo-sensitive areas along a row of the array such that the filter portions are configured to transmit unique light properties to photo-sensitive areas in the set, wherein the set of photo-sensitive areas extend through more than one sub-group of photo-sensitive areas in the array. Thus, the sequence of unique filter portions may ensure that, when a sensor surface is moved in the image plane along a direction of a row over more than the extension of a sub-group, the same portion of an object may be imaged with relation to each of the unique light properties provided by the filter portions in the sequence.

It should be realized that the sequence of unique filter portions may instead be associated with a set of photo-sensitive areas along a column of the array, which may be advantageously combined with moving the sensor surface along a direction of the column.

According to an embodiment, the sequence of unique filter portions is associated with each row of the array and wherein sequences associated with adjacent rows are shifted in relation to each other, such that different light properties are transmitted to photo-sensitive areas in the same column of adjacent rows. Hence, a sub-group extending across plural rows and columns may be sensitive to different light properties in different rows. This provides the sub-group with different filter portions in different rows, such that each unique filter portion in the sequence may be associated with a photo-sensitive area in the sub-group.

According to an embodiment, the sequence of unique filter portions is repeated along the row, and the method further comprises combining the plurality of frames for performing digital time delay and integration based on photo-sensitive areas detecting common light properties for the same portion of the object. Since the sequence of filter portions is repeated, redundant information may be acquired in frames imaging the same portion of the object onto photo-sensitive areas associated with same types of filter portions. This redundant information may be used for digital time delay and integration which may reduce signal to noise ratio in a combined image based on plural frames.

According to an embodiment, said moving of the at least one sensor surface is discontinuous such that the sensor surface is stationary during acquiring of a frame in the plurality of frames. This may be advantageous in avoiding motion blur based on movement of the object in relation to the sensor surface during acquiring of a single frame.

According to an embodiment of discontinuous movement of the at least one sensor surface, an exposure time is varied between acquiring of different frames in the plurality of frames. As a discontinuous movement is used, the exposure time may be easily varied and start/stop of the movement may be related to respective exposure times. Varying the exposure time may allow extending a dynamic range by assembling frames acquired at different exposure times, e.g. different portions of a combined image are taken from different exposure times. This may also be referred to as high dynamic range imaging.

According to an embodiment, the method further comprises operating a device comprising the at least one sensor surface and the at least one optical system in a snapshot mode, said operating in a snapshot mode comprising acquiring a single frame of an object using the array of photo-sensitive areas on the at least one sensor surface, such that each sub-group acquires an image point having a light property resolution defined by the unique light properties in the sub-group; and operating the device in a line-scan mode, said operating comprising said acquiring of a plurality of images in a time sequence and said moving of the at least one sensor surface in the image plane in relation to the at least one optical system.

The method thus allows a versatile operation of an image sensor, such that the same image sensor may be used in a snapshot mode and also in a line-scan mode. This implies that the method allows the same image sensor to be used in very different types of applications, such that a set-up of the image sensor need not be changed in order to allow different types of imaging at a same position.

According to a second aspect, there is provided an image sensor for acquiring an image of an object, said image sensor comprising: an array of photo-sensitive areas arranged in columns and rows, wherein the photo-sensitive areas are configured to detect incident light; and a mosaic filter associated with the array of photo-sensitive areas such that the array is divided into sub-groups of photo-sensitive areas extending across at least two rows and two columns of the array, wherein the mosaic filter is configured to transmit a plurality of unique light properties to the photo-sensitive areas within the sub-group; wherein the mosaic filter comprises a sequence of unique filter portions associated with a set of photo-sensitive areas along a row of the array such that the filter portions are configured to transmit unique light properties to photo-sensitive areas in the set, wherein the set of photo-sensitive areas extend through more than one sub-group of photo-sensitive areas in the array; wherein sequences comprising the unique filter portions is associated with each row of the array and wherein the sequences associated with adjacent rows comprise different orders of the unique filter portions, such that different light properties are transmitted to photo-sensitive areas in the same column of adjacent rows.

Effects and features of this second aspect are largely analogous to those described above in connection with the first aspect. Embodiments mentioned in relation to the first aspect are largely compatible with the second aspect.

By sequences of adjacent rows comprising a different order of the unique filter portions should be understood that the sequences of adjacent rows may be shifted, such that the sequences do not start with the same unique filter portions. However, in another embodiment, the order of the unique filter portions may not merely be cyclically shifted, but rather an individual type of unique filter portion may not be followed by the same type of unique filter portion in adjacent rows.

The image sensor according to the second aspect enables operation in a snapshot mode, wherein a single frame of an object is acquired using the array of photo-sensitive areas on the at least one sensor surface, such that each sub-group acquires an image point having a light property resolution defined by the unique light properties in the sub-group; and operation in a line-scan mode, wherein a plurality of frames are acquired in a time sequence and the image sensor is moved in an image plane in relation to the an optical system for acquiring an image with high spatial resolution and high resolution with respect to light properties. Hence, a versatile image sensor is provided which may be useful in many different applications.

Further, if high spatial resolution is not necessary, the image sensor may be used merely in a snapshot mode, acquiring images in single frames, while maintaining a sensor surface static.

According to an embodiment, the sequence of unique filter portions is repeated along the row. This implies that the image sensor may be used for digital time delay and integration, if the image sensor is moved during acquiring of a plurality of frames, by combining a plurality of frames based on photo-sensitive areas detecting common light properties for the same portion of the object. Thus, a signal to noise ratio of a final image may be reduced. Alternatively, in a line-scan operation mode, the image sensor need only be moved a distance corresponding to the sequence of unique filter portions in order to obtain a large two-dimensional image of an object with full resolution with regard to unique light properties transmitted by the filter portions.

According to an embodiment, a sub-group extends across fewer photo-sensitive areas in a row direction than in a column direction.

The image sensor may be scanned both along a row direction and along a column direction. As the sequence of filter portions is arranged along a row, scanning in the row direction implies that each image point may obtain information relating to each of the unique light properties defined by the filter portions.

However, with regard to the column direction, each unique filter portion may not be provided along a single column. Since it may be desired that each sub-group of plural rows and plural columns comprises all the unique filter portions, the shifting of the sequence of unique filter portions between adjacent rows may cause that only a subset of the filter portions is provided in each column (and different filter portions in different columns). Hence, if the image sensor is to be used in scanning both along a row direction and a column direction, the scanning in the column direction may provide an inferior resolution of different light properties in each spatial image point. However, by having a smaller extension of the sub-group in a row direction than a column direction, a difference of resolution of different light properties when scanning in the column direction (compared to scanning in the row direction) need not be very large.

According to an embodiment, the image sensor further comprises at least one high spatial resolution region in the array of photo-sensitive areas, said photo-sensitive areas in the high spatial resolution regions being arranged to receive a common light property for imaging an object in high spatial resolution with the common light property.

The photo-sensitive areas sensitive to the common light property may allow for forming an image of an object with high spatial resolution based on the common light property. The common light property may for instance be a panchromatic light property such that an image may be formed based on a general light intensity without any information on wavelengths or colors.

The photo-sensitive areas of a common light property may be arranged in a separate region of the array, wherein each photo-sensitive area may form a single image point with regard to the common light property for acquiring an image with high spatial resolution based on the separate region. Thus, a high spatial resolution image of an object may be obtained in a single frame (based at least on a region of the array), albeit with regard to a single common light property.

According to an embodiment, the high spatial resolution region is intermixed with each sub-group in the array. This implies that a plurality of photo-sensitive areas in each sub-group may be sensitive to a common light property, enabling imaging an object with a high spatial resolution for the common light property in a single frame, based on the individual photo-sensitive areas within the sub-group setting the spatial resolution. Each sub-group may further comprise a plurality of unique filter portions for also improving resolution to different light properties within the sub-group.

According to an embodiment, the photo-sensitive areas are formed as active pixels in a complementary metal-oxide-semiconductor (CMOS) substrate and wherein the mosaic filter is monolithically integrated with the CMOS substrate. This implies that the image sensor may be suited for CMOS fabrication, which enables forming of a compact image sensor with integrated filter portions.

According to a third aspect, there is provided a device for acquiring an image of an object, said device comprising: an optical system configured to define an image plane and direct light from an object towards the image plane; the image sensor according to the second aspect, said image sensor being arranged in the image plane; and a translation stage, wherein the translation stage is arranged to carry the image sensor for moving the image sensor in an image plane in a direction along rows or columns of photo-sensitive areas.

Effects and features of this third aspect are largely analogous to those described above in connection with the first and second aspects. Embodiments mentioned in relation to the first and second aspects are largely compatible with the third aspect.

Hence, the image sensor may be integrated in a device comprising a translation stage for moving the image sensor in an image plane defined by the optical system. Thus, the device may be used in a snapscan mode and in a line-scan mode taking advantage of the arrangement of the mosaic filter in relation to the photo-sensitive areas of the image sensor.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

FIG. 2 is a schematic view illustrating arrangement of mosaic filter associated with photo-sensitive areas of an image sensor according to a first embodiment of the invention.

FIG. 3 is a schematic view illustrating arrangement of mosaic filter associated with photo-sensitive areas of an image sensor according to a first embodiment of the invention.

DETAILED DESCRIPTION

Figure 1:
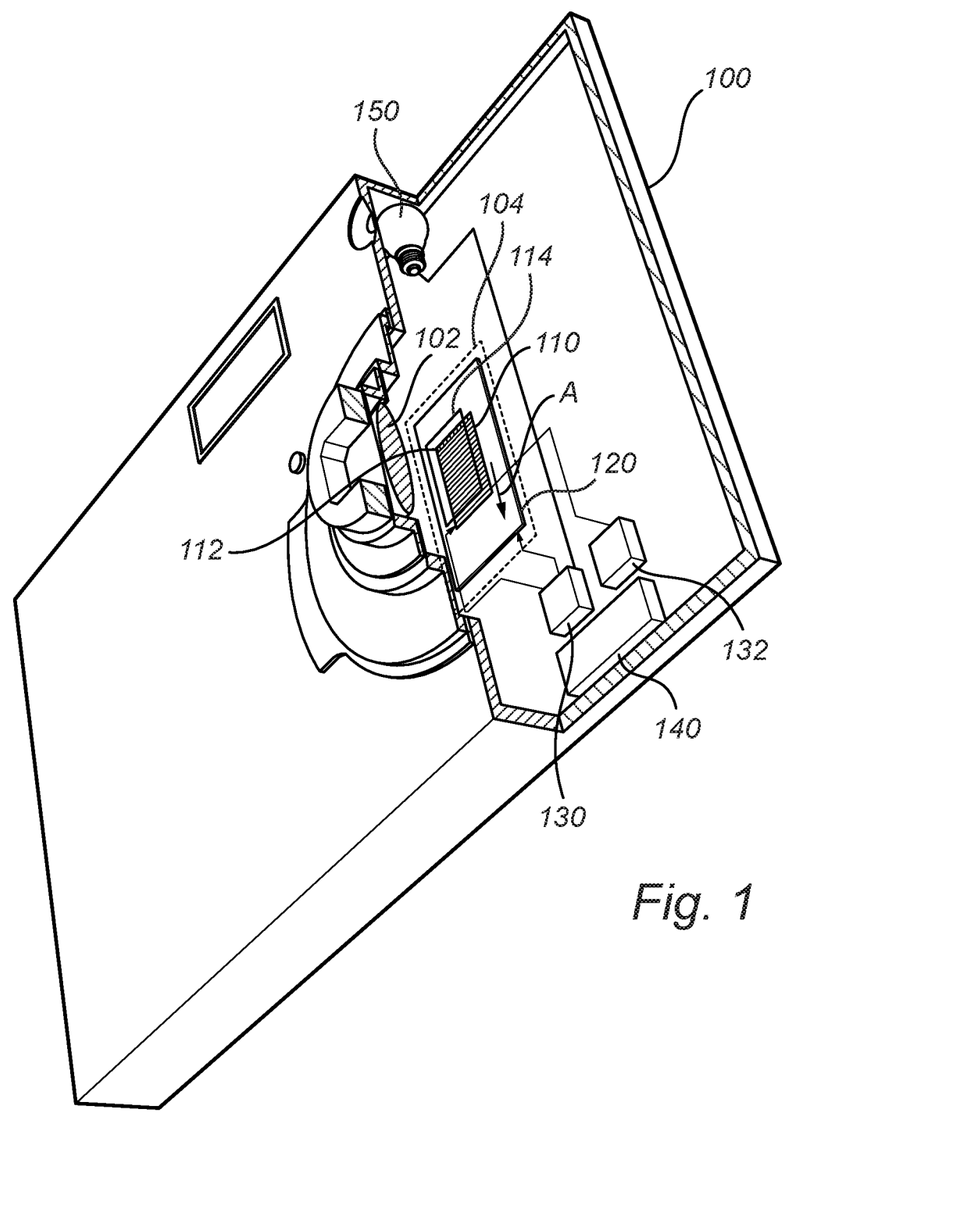
FIG. 1 is a schematic view of a device according to an embodiment of the invention.

Referring now to FIG. 1, a device 100 for acquiring an image having two-dimensional spatial resolution and a resolution to different light properties will be described. It should be realized that the different light properties may be based on a wavelength of the light, a polarization of the light, an intensity of the light, and a propagation direction of the light (angle of incidence of the light towards the filter and the photo-sensitive area), or a combination of the above. However, for simplicity and brevity, it is mainly referred to a spectral resolution in the description below, i.e. a resolution dependent on wavelengths of light.

The device 100 comprises an optical system 102, which is configured to image an object towards an image plane 104 forming an image circle in the image plane 104.

The optical system 102 may comprise a number of optical components for properly imaging the object, such as apertures, stops, and lenses. The optical system 102 may be adaptable to vary e.g. focus or magnification of the optical system 102.

The device 100 further comprises a sensor surface 110, which may be arranged in the image plane 104 of the optical system. Thus, the optical system 102 may be arranged to direct light from an object towards the sensor surface 110 in the image plane 104.

The device 100 may comprise a plurality of optical systems 102, which may be arranged side-by-side to each form an image circle in a common image plane 104. The optical systems 102 may each have different configurations enabling imaging of an object with different optical set-ups.

As will be further described below, the sensor surface 110 may be movable in the image plane 104. When the device 100 comprises a plurality of optical systems 102, the sensor surface 110 may be movable in the common image plane 104 of the plurality of optical systems 102, such that the sensor surface 110 may in different frames record light that has passed different optical systems 102 and optical set-ups.

The device 100 may further comprise a plurality of sensor surfaces 110, which may be arranged in a common sensor plane. Each sensor surface 110 may be adapted for detection of a specific range of wavelengths, e.g. ultraviolet, visible or infrared light. The plurality of sensor surfaces 110 may thus enable acquiring light over a very broad range of wavelengths, which may be useful for imaging an object with a spectral resolution spanning the broad range of wavelengths.

The plurality of sensor surfaces 110 may be used in combination with a plurality of optical systems 102, such that an object may be imaged with different optical set-ups, while acquiring light over a very broad range of wavelengths.

Although the device 100 may comprise a plurality of optical systems 102 and a plurality of sensor surfaces 110, for simplicity and brevity the device 100 will mainly be described below with reference to a single optical system 102 and a single sensor surface 110. Unless specifically stated below, the features described will also apply to a device 100 comprising a plurality of optical systems 102 and/or a plurality of sensor surfaces 110.

The device 100 may optionally comprise a light source 150 for illuminating the object, in order to provide desired lighting conditions when acquiring an image. The light source 150 may be arranged to provide illumination of specific wavelengths in order for the light to interact with the object, such as being specularly or diffusely reflected or inducing emission of light, such as through fluorescence. The sensor surface 110 may thus be arranged to receive and detect light from the object.

The sensor surface 110 may comprise an array of photo-sensitive areas 112 arranged in columns and rows. The sensor surface 110 may comprise a complementary metal-oxide-semiconductor (CMOS) circuitry for arranging photo-sensitive areas 112 on the surface 110 and circuitry for controlling read-out of detection of light in the photo-sensitive area 112. The photo-sensitive areas 112 may also be referred to as pixels.

The photo-sensitive areas 112 and the circuitry on the sensor surface 110 may together form an image sensor for acquiring frames of image information. Each frame may comprise information of detected incident light in at least a subset of rows of photo-sensitive areas 112. The image sensor may further be arranged to acquire a plurality of frames, wherein the plurality of frames may be combined to represent a two-dimensional image of the object having a spectral resolution, as will be described later.

A mosaic filter 114 may be integrated on the sensor surface 110. The mosaic filter 114 may be arranged to transmit specific wavelengths to photo-sensitive areas 112.

The mosaic filter 114 may be associated with the photo-sensitive areas 112 in a manner described in further detail below such that a plurality of unique wavelength bands is transmitted to different photo-sensitive areas.

Each wavelength band may define a narrow range of wavelengths which are detected by the photo-sensitive areas 112 receiving the wavelength band. The plurality of unique wavelength bands may be a plurality of adjacent wavelength bands in a broad range of wavelengths. However, according to an alternative, the wavelength bands may be a plurality of selected wavelength bands from a range of wavelengths, wherein the wavelength bands are not necessarily adjacent to each other in the wavelength spectrum.

Each wavelength band may define a unique, pre-selected wavelength interval, which is detected by the photo-sensitive areas 112 in the wavelength band. The wavelength bands may be adapted to specific requirements, e.g. for facilitating analysis of an object for presence of a compound. The wavelength bands may alternatively comprise a number of adjacent wavelength intervals in a broad range of wavelengths allowing acquiring a two-dimensional image of an object with a spectral resolution facilitating general use of the spectral information.

The sensor surface 110 may be mounted on a translation stage 120. The translation stage 120 may thus carry the sensor surface 110 and may accurately control placement of the sensor surface 110 in the image plane 104. The translation stage 120 may be arranged as a piezo-electric translation stage, which may be accurately controlled in order to provide an accurate placement of the sensor surface 110 in the image plane 104. Thus, the sensor surface 110 may be moved in the image plane 104.

As mentioned above, the mosaic filter 114 may be integrated to the sensor surface 110 such that the mosaic filter 114 will move with the sensor surface 110 and the same photo-sensitive areas 112 will detect the same wavelengths of light regardless of the placement of the sensor surface 110 in the image plane 104. Alternatively, the mosaic filter 114 may also be mounted on the translation stage 120 or connected to the sensor surface 110, such that the filter 114 will move with the sensor surface 110.

The device 100 may further comprise a control unit 130, which may be arranged to control the translation stage 120 and may further be arranged to control the image sensor to acquire a frame. The control unit 130 may thus be e.g. arranged to synchronize movement of the sensor surface 110 and acquiring of frames, as will be further described below.

The control unit 130 may be implemented as a microprocessor, which may be programmable for controlling operation of the microprocessor. For instance, the processing unit may be a central processing unit (CPU). The processing unit may alternatively be a special-purpose circuitry for providing only specific logical operations. Thus, the processing unit may be provided in the form of an application-specific integrated circuit (ASIC), an application-specific instruction-set processor (ASIP) or a field-programmable gate array.

The device 100 may also comprise a combining unit 132 for combining information from a plurality of frames to form multiple channels of an image. The combining unit 132 may be implemented in the same processing unit as the control unit 130 or in another processing unit specially adapted to combining of frames.

It should be realized that one or more of the control unit 130 and the combining unit 132 may alternatively be arranged in an external unit and need not be part of the device 100. The device 100 may thus instead comprise an interface for receiving control signals from an external unit and/or transmitting information in acquired frames to an external unit.

The interface may comprise a communication unit 140 for transmitting and/or receiving information to and from an external unit. The communication unit 140 may be arranged for wired or wireless communication.

In some embodiments, a size of the device 100 may be critical, e.g. if the device 100 is to be used for endoscopic imaging. In such case, the control unit 130 and/or the combining unit 132 may alternatively be arranged in an external unit, such as a personal computer connected to the device 100 such that processing power is arranged externally to the device 100.

The device 100 may be formed in a single housing, such that a relation between the optical system 102 and the translation stage 120 is well-controlled. This may also ensure that a compact assembly of the device 100 is provided.

Referring now to FIG. 2, arrangement of the mosaic filter 114 in relation to the photo-sensitive areas 112 will be described in further detail. As illustrated in FIG. 2, the mosaic filter 114 comprises a sequence of unique filter portions associated with a set of photo-sensitive areas 112 along a row 116a of the array. The sequence of unique filter portions may define a number of wavelength bands, here indicated as numbers 1-16.

Each row may be provided with the sequence of filter portions. However, the sequences associated with adjacent rows may be shifted in relation to each other, such that a first row 116a may start the sequence with the filter portion designated number 1, whereas a second row 116b below the first row 116a may start the sequence with the filter portion designated number 5.

Thanks to the shifting of the sequence of filter portions in adjacent rows, sub-groups 118 having a shape of a rectangle, possibly a square, extending across a plurality of rows and columns, is formed. The sub-groups 118 may comprise unique filter portions, such that each of the unique filter portions in the sequence is included in a single sub-group 118. This implies that the sub-groups 118 may form macro-pixels, having a spectral resolution defined by the unique filter portions included in the sub-group 118.

The sequence of unique filter portions may be repeated along the row of the array. This implies that sub-groups 118 may be formed over the entire sensor surface 110.

The arrangement of the mosaic filter 114 in relation to the photo-sensitive areas 112 enables use of the image sensor in different operational modes. This implies that the image sensor is versatile and may be used in different manners. Hence, an optical set-up which may otherwise require several devices each adapted to a specific operational mode or require adjusting the set-up when an operational mode is to be changed, may now include a single device 100 including the image sensor.

The image sensor may be used in a snapshot mode, wherein an image of an object may be captured by a single exposure of the photo-sensitive areas 112. In the snapshot mode, the light detected in each sub-group 118 may form a single image point. This implies that a spatial resolution of a snapshot image is limited by the number of photo-sensitive sensors 112 in a sub-group 118. However, the snapshot mode enables capturing of an image in a single exposure, i.e. very rapidly, and the image sensor may thus for instance be used when it is required to rapidly capture a series of images of an object.

The image sensor may be static in the snapshot mode. This implies that the image sensor may be mounted in a device, which does not include a translation stage 120. The image sensor may still be used in the snapshot mode and image sensors manufactured to include the mosaic filter 114 do not necessarily need to be mounted in association with a translation stage 120.

The image sensor may further be used in a line-scan mode. In the line-scan mode, the sensor surface 110 may be moved by the translation stage 120, between acquiring of sequential frames, a distance corresponding to a size of a photo-sensitive area 112 such that in a subsequent frame to be acquired, a photo-sensitive area 112 is arranged in relation to the optical system 102 in the same position as the adjacent photo-sensitive area 112 was arranged when acquiring the previous frame.

The sensor surface 110 may be moved by the translation stage 120 in a direction along a longitudinal direction of the rows of photo-sensitive areas 112, as indicated by arrow A. A plurality of frames is acquired while the sensor surface 110 is moved in the image plane 104. A set of photo-sensitive areas 112 with which the sequence of unique filter portions is associated may thus detect incident light in a number of frames, detecting light from the same part of the object but in different wavelength bands defined by the unique filter portions. During acquiring of frames, an individual photo-sensitive area 112 may also detect incident light in a number of frames, detecting light from different parts of the object in each frame.

The plurality of frames may then be combined to form multiple channels of an image. Each channel may be formed based on detected light in a wavelength band, wherein the photo-sensitive areas 112 included in the wavelength band are distributed over the sensor surface 110 and at least one photo-sensitive area in a wavelength band is included in each sequence of unique filter portions. Each channel may thus represent a two-dimensional image of the object for the wavelengths detected in the wavelength band. Together the multiple channels may form a hyperspectral cube, i.e. imaging the object in two spatial dimensions and in a third spectral dimension.

During acquiring of the plurality of frames in the line-scan mode, the sensor surface 110 may be translated a total distance corresponding to a size of the sequence of unique filter portions. This implies that each part of the object is imaged onto each of the wavelength bands defined by the unique filter portions. Once the sensor surface 110 has been translated the distance corresponding to a size of the sequence of unique filter portions (and the number of acquired frames equals the number of filter portions in the sequence), a full two-dimensional image of the object with high spatial resolution (corresponding to the size of the object imaged onto an individual photo-sensitive area 112) and high spectral resolution (corresponding to the number of wavelength bands defined by the unique filter portions) may be formed.

Alternatively, the sensor surface 110 may be translated a larger total distance. This implies that the same part of the object may be imaged in plural frames onto photo-sensitive areas 112 which detect the same wavelength of light. Thus, redundant information of the object may be acquired.

The redundant information may be used for forming e.g. an average for each point on the object of the detected light in each wavelength. Thus, a quality of the image may be improved.

The redundant information may also be used for performing digital time delay and integration based on photo-sensitive areas 112 detecting the same wavelength for the same part of the object. Digital time delay and integration may be used for reducing signal to noise ratio in a combined image. Time delay and integration may be especially advantageous to use in applications where low amounts of light are available.

The plurality of frames (acquired in relation to a single optical system 102) may be acquired while the object is static, such that motion blur is not introduced into the image.

According to an alternative embodiment, the device 100 is arranged to move in concert with the object, e.g. along a conveyor belt, such that the object appears static in relation to the optical system 102. Thus, the plurality of frames may be acquired while a same position on the object is imaged onto a same position in the image plane 104, such that no motion blur will be introduced in the acquiring of a plurality of frames.

The device 100 may be used in a start/stop mode, where translation of the sensor surface 110 is halted between frames. Thus, no motion of the sensor 7 surface 110 occurs during acquiring of a single frame and any motion blur due to movement of the sensor surface 110 may thus be avoided.

Further, when using the device 100 in a start/stop mode, exposure time may be easily varied between acquiring of different frames. Varying the exposure time may allow extending a dynamic range by assembling frames acquired at different exposure times, e.g. different portions of a combined image are taken from different exposure times. This may also be referred to as high dynamic range imaging.

However, the device 100 may alternatively be used in a continuous translation mode. The frames may thus be acquired when the sensor surface 110 is at specific positions in the image plane 104 by means of providing triggering of the acquiring of a frame in synchronization with a speed of movement of the sensor surface 110. The translation stage 120 may move the sensor surface 110 with such precision that sub-pixel registration of the frames may be allowed. The speed of movement of the sensor surface 110 may be so low that the sensor surface 110 is not moved a distance longer than a size of a photo-sensitive area 112 during acquisition time.

In either of the above modes movement of sensor surface 110 by the translation stage 120 needs to be accurately controlled, such that a position of photo-sensitive areas 112 of the sensor surface 110 in the imaging plane 104 is accurately known. In the start/stop mode, the translation stage 120 may be arranged to move the sensor surface 110 a distance corresponding to a size of a photo-sensitive area 112 between acquiring of subsequent frames.

It should be realized that the arrangement of the mosaic filter 114 in relation to the photo-sensitive areas 112 may be varied in many different manners, while maintaining the possibility of acquiring a snapshot image using the sub-groups 118 as macro-pixels in the array and acquiring high resolution images using line-scan of the sensor surface 110.

For instance, the size of a sub-group 118 may be varied. Depending on the number of different wavelength bands that is desired to detect, the size may be varied using e.g. 2×2, 3×3, 4×4 or 5×5 photo-sensitive areas 112 in a sub-group. Also, a sub-group 118 does not need to be square and could comprise e.g. 2×3, 2×4 or 3×4 photo-sensitive areas 112.

In an embodiment, the translation stage 120 may be configured to allow translation of the sensor surface 110 not only along the longitudinal direction of rows but also along the longitudinal direction of columns. This provides a further flexibility of the device 100 and implies that the translation direction of the sensor surface 110 may be changed if needed to a set-up in which the device 100 is mounted is changed.

As is clear from FIG. 2, a column may not comprise all the unique filter portions in the sequence of unique filter portions. This implies that, if the sensor surface 110 is also allowed to be translated along the columns, resolution of an image acquired by translation along columns may not be as good as resolution by translation along rows. Thus, if translation of the sensor surface 110 is allowed in both a row direction and a column direction, it may be beneficial that the sub-group 118 has a smaller extension along rows than along columns.

The sub-groups 118 may not need to be identical over the entire sensor surface 110. For instance, some sub-groups 118 may have different sets of unique filter portions, if e.g. it is desired to image a (small) portion of the object with a specific wavelength information.

According to another alternative, the mosaic filter 114 may define two different sets of unique light properties and hence define two different types of sub-groups 118 and the different types of sub-groups may be alternated within the array of photo-sensitive areas (e.g. alternating between the two types of sub-groups 118 in a column direction of the array). Also, a size of sub-groups 118 need not be identical but may vary between different sub-groups 118.

If the sub-groups 118 are not identical, the sequence of unique filter portions are also not identical. For instance, if two different types of sub-groups 118 are defined in the array, two different sets of sequences of unique filter portions may be used for defining the different types of sub-groups 118.

As shown in FIG. 2, a shift between the sequences of unique filter portions between adjacent rows may be equal to the size of the sub-group 118 in a row direction. Thus, as the sub-groups 118 in FIG. 2 correspond to four photo-sensitive areas 112 in the row direction, the sequence of unique filter portions is shifted four positions between adjacent rows. However, in another embodiment, the sequences may be shifted an integer times the size of the sub-group 118 in a row direction. Thus, in the 4×4 sub-groups 118 in FIG. 2, the sequence of unique filter portions in the four rows of the sub-group 118 may start the sequence with the filter portions designated numbers 1, 9, 5, and 13, respectively (instead of 1, 5, 9, 13, as shown in FIG. 2).

Also, it should be realized that the order of unique filter portions need not be identical in adjacent rows, such that different types of sequences may be used in different rows. In particular, the filter portions within a same sub-group 118 may be placed in different orders, such that the sequence in the second row 116b in FIG. 2 may for instance start with the filter portions designated numbers 8, 7, 6, 5, 12, 11, 10, 9 (instead of 5, 6, 7, 8, 9, 10, 11, 12 as shown in FIG. 2).

According to an embodiment, each filter portion in the sequence of unique filter portions may not be individually unique. On the contrary, one or more filter portions may be repeated within the sequence such that e.g. a particular wavelength band is detected in more photo-sensitive areas 112 than other wavelength bands.

Referring now to FIG. 3, an embodiment is shown, wherein a plurality of identical filter portions is included in the sequence. The image sensor thus allows acquiring an image in snapshot mode, which has a high spatial resolution (based on the common wavelength of the identical filter portions being detected in photo-sensitive areas 112 which are close to each other). In the embodiment shown in FIG. 3, the common wavelength range used in the identical filter portions is a panchromatic wavelength range, i.e. spanning a very broad wavelength range (which may even be realized by the panchromatic photo-sensitive areas 112 not being associated with any filter portion at all).

As also illustrated in FIG. 3, although the sequence of unique filter portions is shifted between adjacent rows, but otherwise the same, the sub-groups 118 are not identical. This occurs because the number of filter portions in the sequence (eight filter portions in the sequence in FIG. 3) is not an integer of the size of the sub-group 118 in a row direction (three in the sub-groups in FIG. 3). Hence, if a snapshot image is acquired, each image point in the snapshot image may not have the same weights of wavelength information (e.g. different number of panchromatic photo-sensitive areas 112). However, if a line-scan image is acquired, a full spectral resolution may still be acquired for each image point when translating the sensor surface 110 over the entire sequence of unique filter portions.

Figure 4:
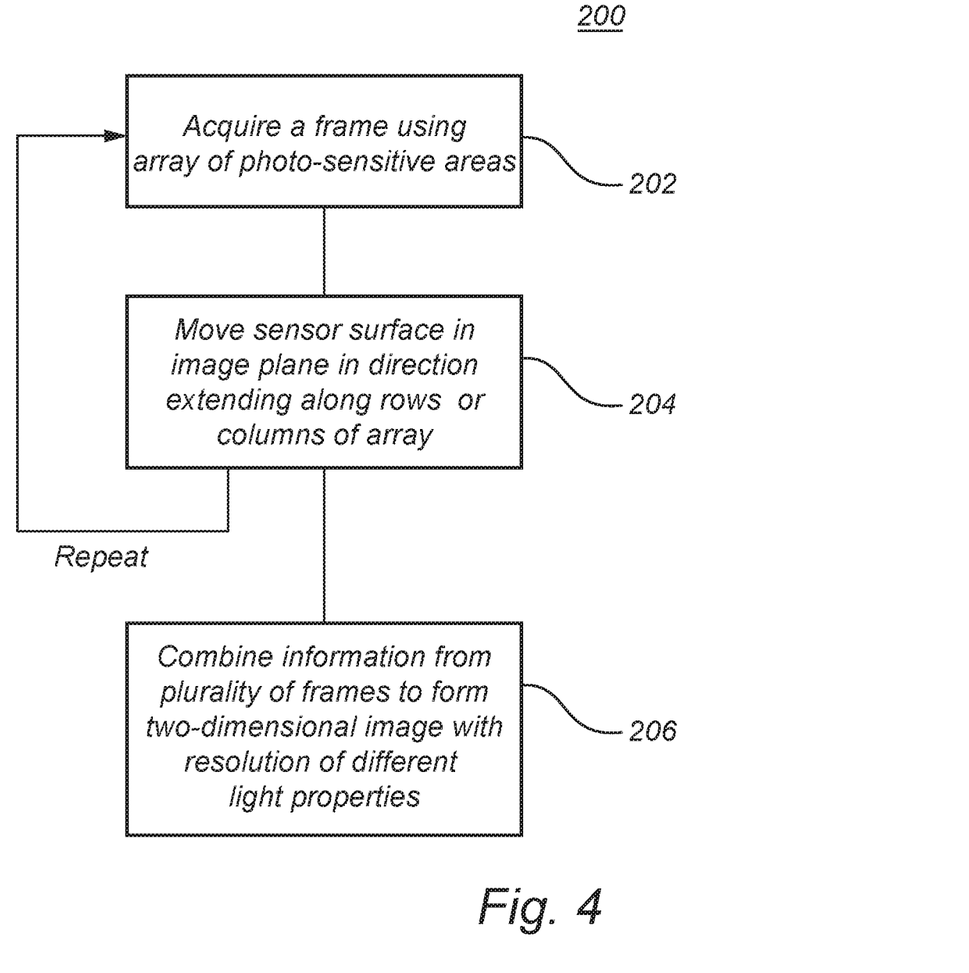
FIG. 4 is a flow chart of a method according to an embodiment of the invention.

Referring now to FIG. 4, a method 200 for acquiring an image of an object will be described using the line-scan capacity of the image sensor described above.

The method comprises acquiring, step 202, a first frame in a time sequence. Each frame is acquired using the array of photo-sensitive areas 112, the mosaic filter 114 being associated therewith for defining sub-groups 118 of photo-sensitive areas 112 in the array. The first frame may thus form a snapshot of an object, but may also be used as input for forming a line-scan image in high resolution.

The method further comprises moving, step 204, the sensor surface 110 in the image plane 104 in relation to the optical system 102 in a direction extending along rows or columns of the array. Thus, the sensor surface 110 is moved in relation to an image of the object formed on the image plane so that a same part of the object imaged onto a first photo-sensitive area 112 when the first frame was acquired is imaged onto an adjacent photo-sensitive area 112.

The method further comprises repeating the acquiring of frames and moving of the sensor surface such that a plurality of frames is acquired in the time sequence and the sensor surface 112 is moved during the time sequence.

Then, information from the thus-acquired plurality of frames may be combined, step 206, to form multiple channels of an image, wherein each channel is formed based on detected light in respective rows of photo-sensitive areas 112 and represent a two-dimensional image of the object for a unique wavelength interval.

Optionally, before initiating combining of a plurality of frames, a check may be performed whether the sensor surface 110 has been scanned over the entire surface to be scanned (e.g. over the entire sequence of unique filter portions), so that each spatial position of an object has been imaged onto each wavelength band on the sensor surface 110. If not, the repeating of the step 202 for acquiring a plurality of frames using different positions of the sensor surface 110 in relation to the optical system 102 may be continued in order to obtain further frames before combining of a plurality of frames is initiated.

If the check finds that the desired frames have been acquired, the combining 206 of information from the thus-acquired plurality of frames may be initiated.

It should be realized, however, that the step 206 of combining plurality of frames to form multiple channels of an image may be initiated before all frames have been acquired. Also, an image may be formed even if all frames are, for some reason, not acquired. Hence, if the check never finds that the entire surface to be scanned has actually been scanned, the step 206 may still be performed based on the frames that have been acquired to form an image which may lack information of some of the multiple channels.

In the above the inventive concept has mainly been described with reference to a limited number of examples. However, as is readily appreciated by a person skilled in the art, other examples than the ones disclosed above are equally possible within the scope of the inventive concept, as defined by the appended claims.

Although the sequence of unique filter portions is described above with relation to spectral filters, selecting different wavelength bands to be transmitted to the photo-sensitive areas 112, other light properties may be selected by the filter portions. The unique light properties transmitted to photo-sensitive areas 112 may thus alternatively be based on a polarization of the light, an intensity of the light, and a propagation direction of the light (angle of incidence of the light towards the filter and the photo-sensitive area 112). The unique light properties transmitted to photo-sensitive areas 112 may also be based on a combination of the above properties. Thus, by acquiring a plurality of frames while moving the sensor surface 110, a two-dimensional image may be formed with high spatial resolution and with a resolution based on different light properties (such as wavelengths, polarization, intensity and angle-dependence) defined by the filter portions.

The invention claimed is:

1. A method of acquiring an image of an object, said method comprising:
  acquiring a plurality of frames in a time sequence, each frame being acquired using at least a portion of an array of photo-sensitive areas on at least one sensor surface, which at least one sensor surface is arranged in relation to at least one optical system in an image plane defined by the at least one optical system, wherein the photo-sensitive areas are configured to detect incident light from an object imaged by the at least one optical system onto the image plane, wherein the photo-sensitive areas are arranged in columns and rows of the array and wherein a mosaic filter is associated with the array such that the array is divided into sub-groups of at least five photo-sensitive areas extending across at least two rows and at least two columns of the array, wherein the mosaic filter is configured to transmit at least five different multispectral light properties to the photo-sensitive areas within the sub-group such that each photo-sensitive area within the sub-group is associated with a unique filter portion and wherein the mosaic filter comprises a sequence of unique filter portions associated with a set of photo-sensitive areas along a row of the array such that the filter portions are configured to transmit mutually unique light properties to photo-sensitive areas in the set, wherein the set of photo-sensitive areas extend through more than one sub-group of photo-sensitive areas in the array;
  during said time sequence, moving the at least one sensor surface in the image plane in relation to the at least one optical system in a direction extending along rows or columns of the array, wherein the plurality of frames, by said moving, are acquired using different positions of the at least one sensor surface in relation to the at least one optical system for imaging same portions of the object onto different photo-sensitive areas, whereby the plurality of frames acquires different light property information for the same portion of the object and a number of different light properties acquired for the same portion of the object is larger than the number of different light properties transmitted to photo-sensitive areas along a row or column within a sub-group.

2. The method according to claim 1, wherein the sequence of unique filter portions is associated with each row of the array and wherein sequences associated with adjacent rows are shifted in relation to each other, such that different light properties are transmitted to photo-sensitive areas in the same column of adjacent rows.

3. The method according to claim 1, wherein the sequence of unique filter portions is repeated along the row, and the method further comprises combining the plurality of frames for performing digital time delay and integration based on photo-sensitive areas detecting common light properties for the same portion of the object.

4. The method according to claim 1, wherein said moving of the at least one sensor surface is discontinuous such that the sensor surface is stationary during acquiring of a frame in the plurality of frames.

5. The method according to claim 4, wherein an exposure time is varied between acquiring of different frames in the plurality of frames.

6. The method according to claim 1, further comprising operating a device comprising the at least one sensor surface and the at least one optical system in a snapshot mode, said operating in a snapshot mode comprising acquiring a single frame of an object using the array of photo-sensitive areas on the at least one sensor surface, such that each sub-group acquires an image point having a light property resolution defined by the different light properties in the sub-group; and operating the device in a line-scan mode, said operating comprising said acquiring of a plurality of images in a time sequence and said moving of the at least one sensor surface in the image plane in relation to the at least one optical system.

7. The method according to claim 1, wherein the mosaic filter is configured to transmit an identical set of different light properties to each sub-group in the array.

8. An image sensor for acquiring an image of an object, said image sensor comprising:
   an array of photo-sensitive areas arranged in columns and rows, wherein the photo-sensitive areas are configured to detect incident light; and
   a mosaic filter associated with the array of photo-sensitive areas such that the array is divided into sub-groups of at least five photo-sensitive areas extending across at least two rows and at least two columns of the array, wherein the mosaic filter is configured to transmit at least five different multispectral light properties to the photo-sensitive areas within the sub-group such that each photo-sensitive area within the sub-group is associated with a unique filter portion;
   wherein the mosaic filter comprises a sequence of unique filter portions associated with a set of photo-sensitive areas along a row of the array such that the filter portions are configured to transmit mutually unique light properties to photo-sensitive areas in the set, wherein the set of photo-sensitive areas extend through more than one sub-group of photo-sensitive areas in the array;
   wherein sequences comprising the unique filter portions are associated with each row of the array and wherein the sequences associated with adjacent rows comprise different orders of the unique filter portions, such that different light properties are transmitted to photo-sensitive areas in the same column of adjacent rows.

9. The image sensor according to claim 8, wherein the sequence of unique filter portions is repeated along the row.

10. The image sensor according to claim 8, wherein a sub-group extends across fewer photo-sensitive areas in a row direction than in a column direction.

11. The image sensor according to claim 8, wherein the photo-sensitive areas are formed as active pixels in a complementary metal-oxide-semiconductor (CMOS) substrate and wherein the mosaic filter is monolithically integrated with the CMOS substrate.

12. A device for acquiring an image of an object, said device comprising: an optical system configured to define an image plane and direct light from an object towards the image plane;
   the image sensor according to claim 8, said image sensor being arranged in the image plane; and
   translation stage, wherein the translation stage is arranged to carry the image sensor for moving the image sensor in an image plane in a direction along rows or columns of photo-sensitive areas.

* * * * *